United States Patent [19]
von Wettstein et al.

[11] 4,165,387
[45] Aug. 21, 1979

[54] METHOD OF BREWING BEER OF IMPROVED STABILITY

[75] Inventors: Dietrich H. von Wettstein, Vaerløse; Bent Ahrenst-Larsen, Virum; Inga B. Jende-Strid, Allerød; Jørgen A. Sørensen, Virum, all of Denmark

[73] Assignee: De Forenede Bryggerier A/S, Copenhagen, Denmark

[21] Appl. No.: 731,497

[22] Filed: Oct. 12, 1976

[30] Foreign Application Priority Data

Oct. 15, 1975 [DK] Denmark .................... 4640/75

[51] Int. Cl.$^2$ .................... C12C 1/00; C12C 11/04
[52] U.S. Cl. .................... 426/16; 426/29; 426/64
[58] Field of Search .............. 426/16, 29, 64; 195/19, 195/69, 70, 71

[56] References Cited

PUBLICATIONS

Jende-Stid, Barbro, Mutations Affecting Flavonoid Synthesis in Barley, Barley Genetics III, 1976 (p. 36) Proceedings of Third International Barley Genetics Symposium, Jul., 1975.

Trolle, B., Bryggerimessige Betragtninger Vedrorende Malt by G. Brygmesteren, No. 2, 1960 (pp. 45–55).

Gustafsson, et al., Hereditas, vol. 62, 1969, (pp. 409–414).

Nilan, R. A., The Cytology and Genetics of Barley, Washington University Press, 1964 (pp. 118–120 & 136–138).

Goering et al., Barley Starch IV. A Study of the Cooking Viscosity Curves of Twelve Barley Genotypes, Cereal Chemistry, vol. 47, 1970 (pp. 592–596).

Goering, et al., Barley Starch V. A Comparison of the Properties of Waxy Compana Barley with the Starches of its Parents. Cereal Chemistry, vol. 50, No. 3, 1973 (pp. 322–328).

*Primary Examiner*—David M. Naff
*Attorney, Agent, or Firm*—Ladas, Parry, Von Gehr, Goldsmith & Deschamps

[57] ABSTRACT

Haze formation in beer caused by anthocyanogens is reduced by using a mutant strain of barley having low anthocyanogen content as the source of barley or malted barley from which wort is prepared in the brewing process.

3 Claims, No Drawings

METHOD OF BREWING BEER OF IMPROVED STABILITY

This invention relates to a method of brewing beer of improved stability by using an extract, described as wort, of barley or malted barley.

In the brewing of beer by using barley or malted barley the known methods will result in products of more or less limited stability or shelf life. After filling in bottles and casks and pasteurizing the beer will become hazy when left to stand for some time. Dependent on the type of beer, the storage time and the temperature there will be various degrees of haze, from a faintly blurred appearance to visible fluffs or precipitate. This change in the beer is accelerated by high temperatures such as 40°-60° C. The longer time the beer stays clear the higher its chemical or colloidal stability is said to be.

The increased haze formation after bottling of the beer is attended with an increase of the chill-haze of the beer, which is the haze caused in the beer when after storage at temperatures from 10° to 60° C. it is cooled down to temperatures about 0° C. for 24-48 hours. The amount of chill-haze is used as a measure of the chemical or colloidal stability of the beer; the less chill-haze the longer the shelf life of the beer is said to be.

Brewing literature sometimes offers another definition of chill-haze in beer, viz. the difference between the haze of the beer measured at 0° C. and the haze of the same beer measured after storage at room temperature for a predetermined period of time. Also this chill-haze, which is likewise increased with the age of the beer from bottling, is used as a measure of the stability of the beer; the less haze the longer the shelf life of the beer.

The normally occurring haze formation has various causes, but the most important factors affecting the haze formation are the content in the beer of oxygen, proteins, polypeptides and polyphenols.

Generally proteins and polypeptides together with a number of different polyphenols will form compounds which are insoluble in beer, and oxygen will cause oxidation and polymerisation of polyphenols so that they develop a higher capacity than the monomeric compounds for forming insoluble compounds with proteins and polypeptides.

It is universally known that the socalled anthocyanogens (3,4-flavanediols), which are a group among the polyphenols, contribute in a special degree to haze formation, and tests have shown that the stability of beer under otherwise identical conditions is highest in samples drawn from barley with the lowest content of anthocyanogens. Chemically the anthocyanogens belong to the flavanoids and the description was introduced by Harris and Ricketts (Journal of the Institute of Brewing 1958, 22-32, and European Brewery Convention, proceedings of the Congress, Rome, 1959, 290-302) who give the formula

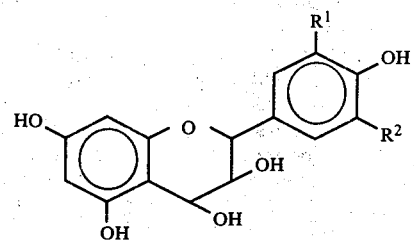

wherein $R^1$ and $R^2$ can be either H, OH or $OCH_3$.

Another group of chemical compounds among the flavanoides which also participate in the haze formation of beer is the catechins. Their effect is not considered as decisive as that of the anthocyanogens, though. The formula of these compounds is the following:

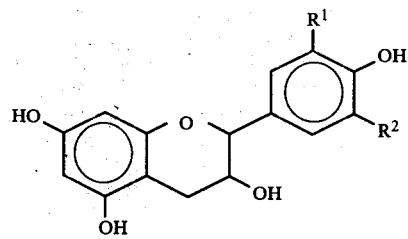

wherein $R^1$ and $R^2$ can be either H, OH or $OCH_3$.

Barley normally contains from 120 to 200 mg of anthocyanogens and from 120 to 200 mg of catechins per 100 g of dry matter.

It has been demonstrated by several works from the late sixties that the monomeric anthocyanogens or catechins are incapable of precipitating high-molecular proteins and thus form haze in beer but have to be polymerized first. This also happens in the beer, and the polymerization may occur not only within the same type of molecule but also between anthocyanogen and catechin; the formed polymerization products are described as bi-, tri-, tetra-flavanoids etc. A biflavanoid has been found in barley and malt. It is also known that the polymerization will be highly promoted by oxygen.

The introduction by Harris and Ricketts of the description "anthocyanogens" was rapidly accepted in brewing literature. Freudenberg and Weinges, however, described the same group of substances as "proanthocyanidins" (Tetrahedron, London 1960, 8, 336), and this description has been accepted to some extent in brewery literature in later years.

It is desirable to produce beer with a maximum of stability, i.e. to avoid or delay the normal haze formation. To attain this it has been endeavoured to prevent the beer getting into contact with atmospheric oxygen during filtering and filling and to separate or remove the substances that cause hazing, particularly the anthocyanogens.

Additives of various types have been used to neutralize or remove the anthocyanogens. The effect of such additives or stabilizers is caused either by reaction with oxygen or polyphenols by absorption or precipitation of these compounds.

Examples of applicable additives of this type include insoluble polyvinylpyrrolidone and silica gel, which adsorb and remove the anthocyanogens wholly or partly and thus increase the stability of the beer. A complete removal of the anthocyanogens and catechins in this way would require the use of unacceptably large amounts of stabilizers, and the necessary subsequent filtering procedure would be impeded.

Since the content of anthocyanogen and the content of catechin are different in the different strains of barley it would suggest itself to attain the improvement of stability by using a strain with the lowest possible content of anthocyanogens and/or catechins as starting material in the production of beer. It might also be expected that by hybridizing naturally available strains of barley it would be possible to obtain strains with a lower content of anthocyanogens and thus to produce beer with longer shelf life (B. Trolle, Brygmesteren, No. 2, 1960, pp. 45–55). This idea has not produced any practical results, though.

By means of mutatory agents it has been possible to obtain barley mutants that do not synthetize anthocyans in leaves, stem and ear (Å. Gustafsson, A. Hagberg, U. Lungqvist and G. Persson. Hereditas 62, 409–414 (1969); R. A. Nilan, The Cytology and Genetics of Barley 1951–1962, Washington University Press 1964).

Anthocyans or anthocyanidine derivatives are pigments formed during the same flavonoid synthesis as leads also to anthocyanogens. The experiments which led to the present invention included detailed examination of a number of anthocyan-free mutants, only a single one of which, however, was suitable for the brewing of beer of improved stability.

The suitable mutant, described as ANT-13, was found to be free of anthocyanogens and must thus have acquired an inherent genetic blocking of the anthocyanogen synthesis.

The present invention is thus based on the realization that an improvement of the desired property can be achieved only by using a mutant with a blocking of early step of the common biochemical synthesis path leading to anthocyanogens or proanthocyanidines, while the effect will not be obtained by using other anthocyan-free mutants in which only the branch of the path producing anthocyanidins is affected.

It is the object of the present invention to improve the stability of beer produced from barley or malted barley.

Another object of the invention is to produce beer of improved stability without addition of precipitants or other additives. This has been found to be possible according to the invention by using an extract or wort formed by means of a strain of barley with an inherent genetic complete or partial blocking of the anthocyanogen synthesis and/or the catechin synthesis in the barley.

The production of the beer based on barley with a low content of anthocyanogen and/or catechin may follow conventional brewing methods, using for instance conventional yeast fungi or enzyme reaction.

To obtain a significant improvement of the stability the strain of barley used in preparing the wort should have a content of anthocyanogens and/or catechins less than 100 mg per 100 g of dry matter. According to the invention the specifically preferred content of anthocyanogens and catechins is less than 20 mg per 100 g of dry matter, and optimum results will be attained by a content of anthocyanogen and catechin less than 10 mg per 100 g of dry matter.

The naturally available strains of barley generally have a content of more than 100 mg of anthocyanogens and more than 100 mg of catechins per 100 g of dry matter, the anthocyanogen content being determined by the method suggested by M. Dadic: ASBC Proceedings 1971, p. 159.

The invention will be illustrated by the following example, which covers parallel brewing experiments, partly with an anthocyanogen-free and catechin-free mutant described as ANT-13, partly with a generally used strain of barley (Ymer). Malt and beer were made from both strains in traditional manner. Analyses were made on the starting material, the malt, the wort, and the finished beer. The results are set out in the following example.

EXAMPLE

EXAMPLE

| Strain of Barley | | | ANT-13 | Ymer |
|---|---|---|---|---|
| Barley: | anthocyanogens | mg/100 g dry matter | 0 | 140 |
| | catechins | mg/100 g dry matter | 1 | 147 |
| Malt: | extract, fine-meal | %/dry matter(Plato) | 79.6 | 78.6 |
| | anthocyanogens | mg/100 g dry matter | 1 | 110 |
| | catechins | mg/100 g dry matter | 4 | 130 |
| Wort: | Original extract | % Plato | 10.9 | 10.9 |
| | apparent final fermentation | % | 77.0 | 77.5 |
| | anthocyanogens | mg/liter | 0 | 73 |
| Beer: | Original extract | % Plato | 10.8 | 10.7 |
| | apparent fermentation | % | 74 | 74 |
| | anthocyanogens | mg/liter | 1 | 57 |
| | foam-halving time, seconds | | 99 | 90 |
| | ml air per bottle | | 0.8 | 0.8 |
| | increase of chill-haze after storage at 450° C: | | | |
| | 1 week | EBC-units | 0.2 | 4.4 |
| | 4 weeks | EBC-units | 0.8 | >20 |

| METHODOLOGY OF ANALYSIS | |
|---|---|
| Anthocyanogens: | M. Dadic: A.S.B.C. Proceedings 1971, 159–170, M. Dadic & N. M. Morrison: A.S.B.C. Proceedings 1972, 50–56. |
| Catechins: | see anthocyanogens. |
| Extract in malt: | Analytica-EBC, 3rd Ed. E 25. |
| Original extract of wort: | Analytica-EBC, 3rd Ed. E 55. |
| Apparent final fermentatin of wort: | Analytica-EBC, 3rd Ed. E 58. |
| Original extract of beer: | Analytica-EBC, 3rd Ed. E55. |
| Apparent fermentation of beer: | Analytica-EBC, 3rd Ed. E 58. |
| Foam-halving time: | Blom's Method: EBC. Proceedings 1957, 51. |
| Chill-haze in beer: | Tuborg Method: Fresh-drawn beer is left to stand for 48 hours at 0° C.; haze measured by means of Zeiss nephelometer, red light, conversion to EBC-units After storate at 45° C. for respectively 1 and 4 weeks the chill-haze is determined as above described. The increase in the difference between the values of the two readings. |

What we claim is:

1. In a method of manufacturing beer of acceptable stability and taste wherein wort extracted from barley or malted barley is fermented to produce beer, the improvement which comprises using a strain of barley having a content of less than 20 mg of anthocyanogens per 100 g of dry matter caused by an inherent genetical blocking of the anthocyanogen synthesis in the barley.

2. Method according to claim 1, wherein the barley used is the mutant ANT-13 of the strain Foma.

3. Method according to claim 1, wherein the barley used has a content of anthocyanogens less than 10 mg per 100 g of dry matter.

* * * * *